THERMO-COMPRESSION BONDING APPARATUS

Filed Oct. 6, 1960 4 Sheets-Sheet 1

INVENTORS
G.A. FRANK
K.A. SCHMULDT
BY S. Gundersen
ATTORNEY

INVENTORS
G. A. FRANK
K. A. SCHMULDT

BY S. Gundersen
ATTORNEY

THERMO-COMPRESSION BONDING APPARATUS

Filed Oct. 6, 1960 4 Sheets-Sheet 3

INVENTORS
G. A. FRANK
K. A. SCHMULDT
By S Gundersen
ATTORNEY

INVENTORS
G. A. FRANK
K. A. SCHMULDT
BY S. Gundersen
ATTORNEY

United States Patent Office 3,083,595 Patented Apr. 2, 1963

3,083,595
THERMO-COMPRESSION BONDING APPARATUS

Gerard A. Frank, Allentown, and Karl A. Schmuldt, Emmaus, Pa., assignors to Western Electric Company, Incorporated, New York, N.Y., a corporation of New York Filed Oct. 6, 1960, Ser. No. 60,964
6 Claims. (Cl. 78—82)

This invention relates to bonding apparatus and particularly to apparatus utilized in the thermo-compression bonding of leads to semiconductive devices.

In the fabrication of semiconductive devices, such as transistors, contact wires having about a 1-mil diameter are connected from alloyed metal stripes on the semiconductor mesa to their corresponding terminals on a header. Heretofore, the operator manually oriented and controlled the movement of a bonding tool to perform the bonding operation. A tool of this type is disclosed in the pending application of Robert P. Clagett, Serial No. 821,444, filed June 19, 1959. The operation of such apparatus is time consuming and fatiguing. Furthermore, the accuracy of each bonded connection depends upon the operator's skill to properly orient the bonding tool with respect to each stripe and terminal on the mesa.

The object of this invention is a bonding apparatus capable of bonding contact leads on semiconductive devices quickly, simply, and efficiently after a single orientation of the semiconductor.

According to the general features of the invention, the bonding areas on a semiconductive device are oriented with respect to a bonding tool. A locating mechanism is utilized to position the tool to successive predetermined locations for automatically bonding at each area.

In a preferred embodiment, after the semiconductive device is oriented to a known location for the bonding, the tool is moved to a predetermined stop so that it automatically is in a bonding position over the terminal. A camming device lowers the tool to bond the contact wire to the terminal and then lifts it to its raised position. The bonding tool is moved to a second predetermined stop where it is automatically positioned over the stripe, the camming device again being operated to bond the wire, this time to the stripe. As the tool is raised and moved to its normal retracted position, a braking element applies a restraining force on the wire to cause the wire to break adjacent the last bond. The broken end of the wire is then formed over the bonding surface on the tool preparatory for the next bonding cycle.

Other objects and a fuller understanding of this invention may be had by referring to the following drawings in which.

Figure 13:
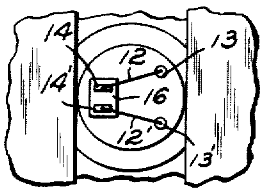

FIGS. 6, 7, 8, 9, 10, 11 and 12 disclose the various steps of the bonding sequence;

FIG. 13 is a plan view of the bonded contact wires on the semiconductive device.

With respect to the drawing, the invention is incorporated in an apparatus having two bonding units 10 and 11 for bonding contact wires 12—12' from terminal posts 13—13' on a header 15 to their corresponding alloyed metal stripes 14—14' of a semiconductor wafer 16. Heat is imparted to the wafers through the header from a heating unit 17 to effectuate a thermo-compression bond. The heater 17 is mounted on a conventional positioning device shown generally by a box numbered 18. This device moves the header in any direction on the X—Y or horizontal plane. The units 10 and 11 are successively operated, as later described, for bonding one terminal to its corresponding stripe, i.e., unit 10 is utilized to bond the contact wire 12 between the right terminal 13 and right stripe 14 while unit 11 is utilized to bond the wire 12' between the left terminal 13' and left stripe 14'.

Figure 5:
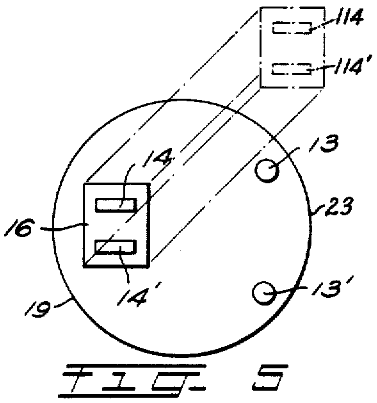
FIG. 5 is a view of the comparator screen depicting the registration of the bonding areas with the markings on the screen.

The wafers 16 are positioned on a jig 20 which is indexed by means well known in the art to locate the wafers under the lens 19 of a comparator 24. The jig is secured each time a wafer is indexed into the bonding position by a resiliently movable bar 21 which engages a notch 22 located on the jig opposite each wafer. The wafer to be bonded is then permanently oriented in bonding position by the X—Y positioning device 18 so that the stripes 14—14' are in optical registration with reference markings 114—114' on the comparator screen 23 (FIG. 5). This is the only orientation required by the operator for the bonding operations.

Figure 1:
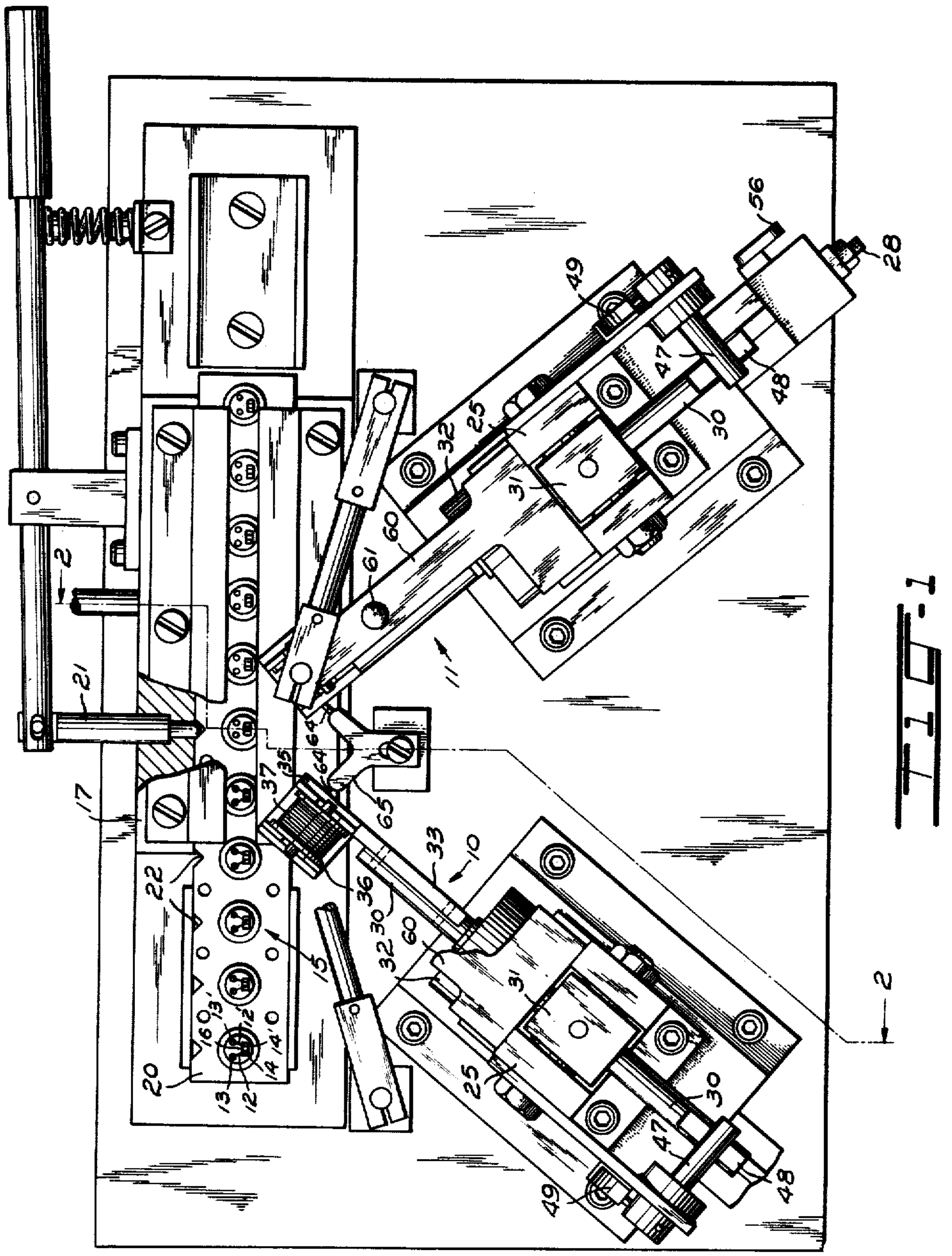
FIG. 1 is a plan view of the bonding apparatus embodying the invention for bonding two contact wires to transistor elements. In this view a comparator screen, normally mounted above the apparatus is removed to simplify the drawing.
Figure 2:
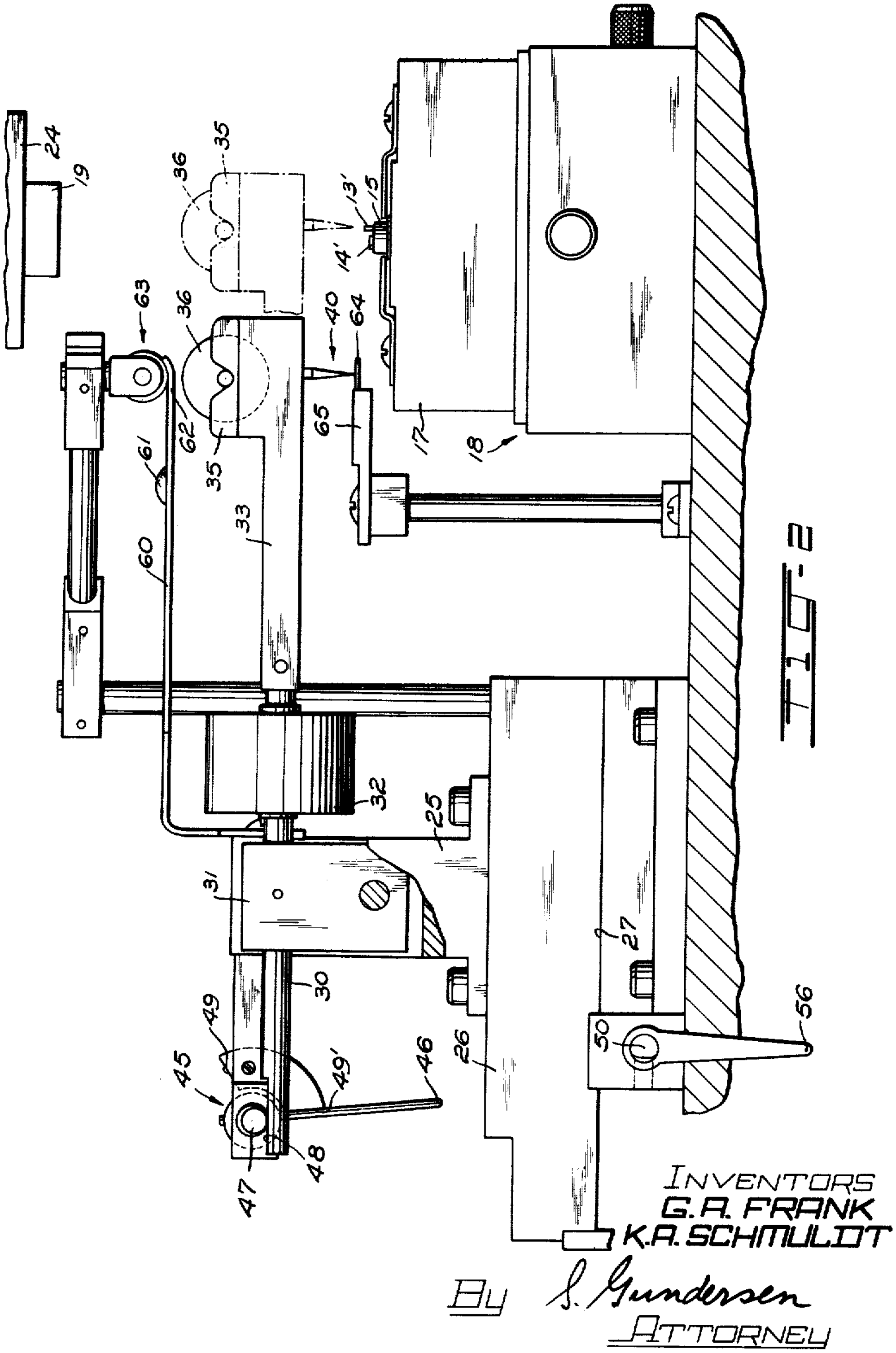
FIG. 2 is a partial sectional view of the apparatus depicting one of the bonding tools in the raised position, as seen along line 2—2 of FIG. 1.
Figures 3, 4:
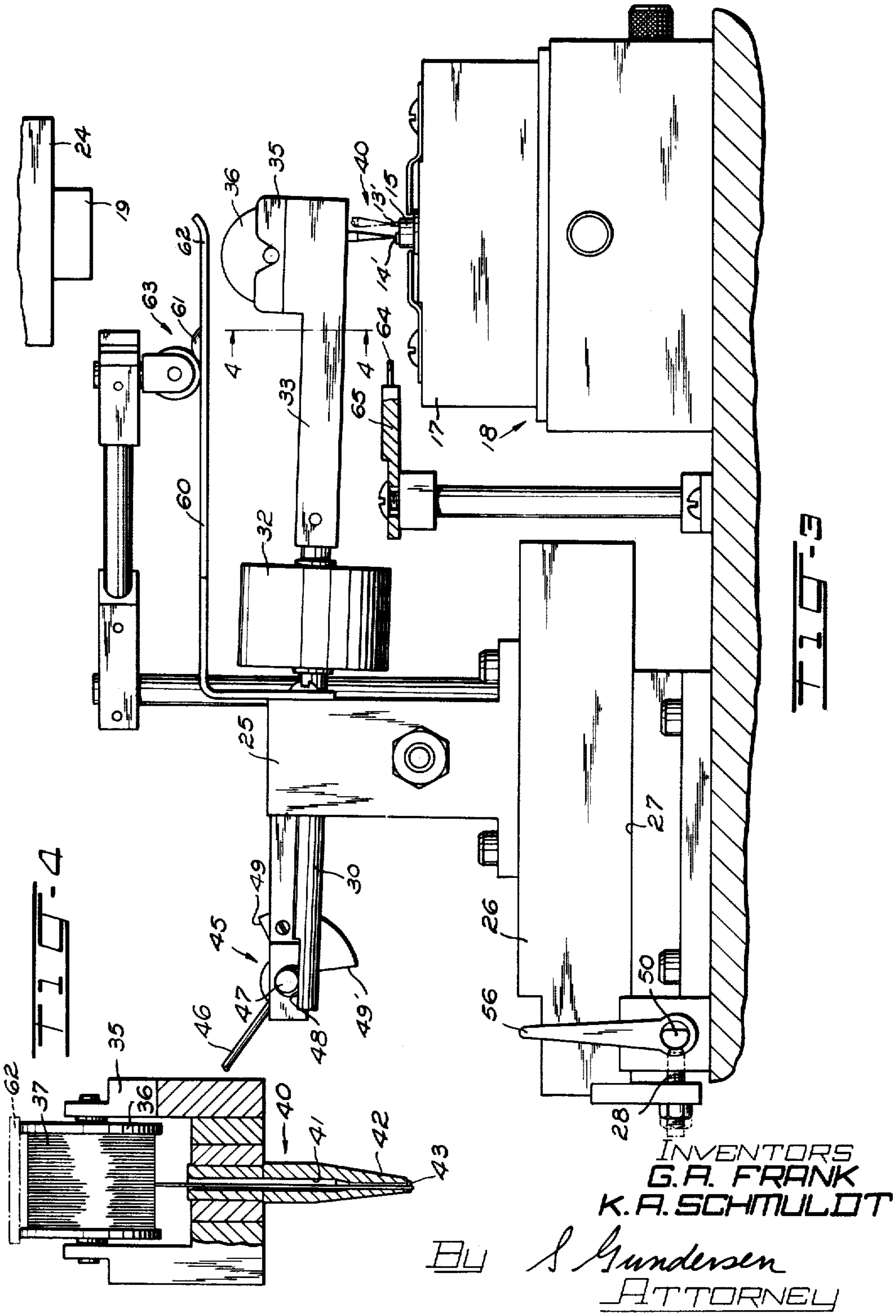
FIG. 3 is a view of the apparatus depicting the bonding tool in the lowered bonding position.
FIG. 4 is a sectional view of the bonding tool, as seen along line 4—4 of FIG. 3.

As seen in FIGS. 1, 2 and 3, the bonding units 10 and 11 are in a normally retracted position during the indexing and orienting of the wafers. In view of units 10 and 11 having the same structure and function, it will suffice to describe only unit 10 in detail. Unit 10 consists of a support 25 mounted on a slide 26 movable along base 27. A stylus lever 30 extends through a fulcrum member 31 connected to support 25 and has a weighted element 32 on its terminal end 33. A supply stand 35 is connected to the terminal end 33 for holding a spool 36 of wire supply 37 being reeled off as the contact wire 12 for the connection between the terminal 13 and stripe 14.

As seen in FIG. 4, the wire is passed through a tube-like bonding tool 40, similar to that of a hypodermic needle. The tool has an opening 41 which is constricted near its pointed end 42 with a diameter slightly larger than that of the wire passing therethrough to facilitate the forming of the wire about a transverse cylindrical element 43 located along one side of the opening at the end of the tool.

Figure 6:
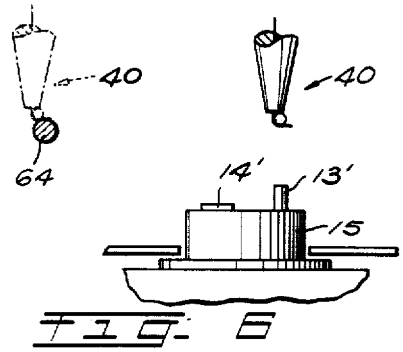
Figure 7:
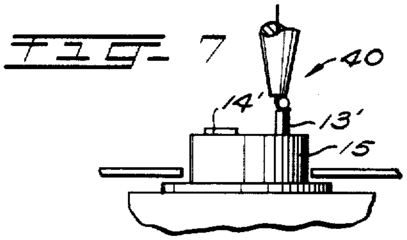
Figure 8:
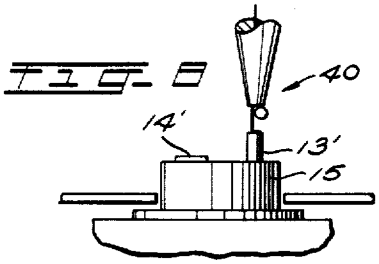

In its normal retracted position, as seen in FIG. 2, the unit 10 has a cam manipulator assembly generally referred to at 45, which consists of a cam lever handle 46 disposed in a normally down position so that its eccentric cam 47 connected thereto engages the end 48 of stylus lever 30 to maintain the bonding tool 40 in a raised position over the mesa 15. Unit 10 is moved, either by manual or conventional mechanical means, inwardly towards the wafer over base 27 until a set screw 28 thereon contacts an eccentric cam shaft 50 to stop the unit. In this position, as seen in FIGS. 3 and 6, the bonding tool 40 is directly over the right post 13. The cam lever handle 46 is rotated until it strikes stop end 49, as seen in FIG. 3, to activate the eccentric surfaced cam 47 along the end 52 of stylus lever 30 to cause the tool to descend on post 13 under the force of the weighted member 32 and pivotal action of the fulcrum member 31, bond the wire and then return to its normally raised position. As illustrated in FIGS. 6, 7 and 8, the tool descends on, bonds, and ascends from post 13 all within the single clockwise movement of the handle 46.

Figure 9:
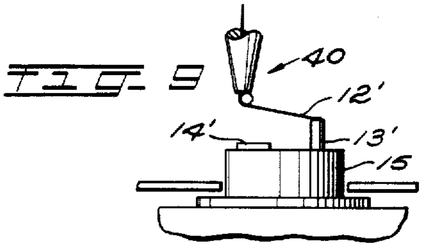
Figure 10:
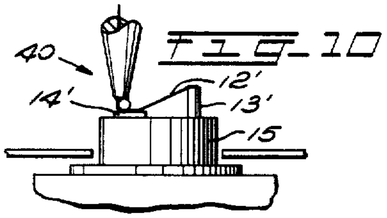
Figure 11:
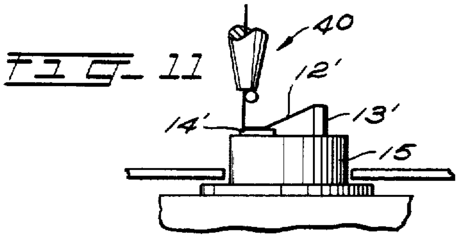

As seen in FIGS. 2 and 3, a second cam lever handle 56, connected to cam 50, is rotated counterclockwise causing the high side of cam 50 to push against screw 28 to retract the bonding unit a predetermined distance so that the bonding tool 40 is positioned directly over the right stripe 14, as illustrated in FIG. 9. The configuration of cam 50 is such that it moves the slide and bonding unit a distance equal to that of the distance between the two bonding areas 13 and 14. The first cam lever handle 46 is then rotated counterclockwise to its normal resting position against stop end 49' causing bonding tool 40 to descend on, bond, and ascend from the right stripe, as seen in FIGS. 10 and 11, similar to that described with the bonding of post 13.

Figure 12:
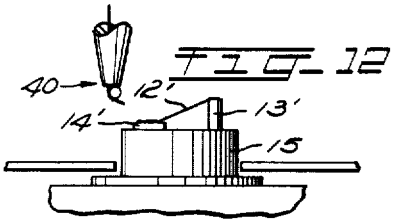

A brake lever 60 is connected to support 25 and extends over and beyond the spool 36. A button cam 61 is provided on the top surface of lever 60 causing the lever end 62 to descend on and press against the spool 36 as the cam contacts an overhead roller mechanism 63 during the retraction of unit 10 to its inoperative position. Upon this cam contact, the rotation of spool 36 and the reeling off of the supply wire is stopped and a restraining force is applied on the supply wire causing it to snap, as seen in FIG. 12, at its weakest point, said point being just beyond the bond of the right stripe where the wire is flattened by the bonding surface 43 of the bonding tool.

As unit 10 continues to retract, tool 40 passes transversely over a forming rod 64 secured in holder 65, causing the wire to bend and form about the elongated rounded element 43, an approximate 90° angle relative to the tool axis. The newly formed end of the contact wire 12 and unit 10 are now ready for the next bonding operation on a new mesa after unit 11 is operated to bond its contact wire 12' between the left post 13' and left stripe 14' in a similar manner to that of unit 10.

This invention has been described in such a manner that the first bond was made on the right post and the second bond on the right stripe. It is to be understood, however, that the orientation of the header can be such that the first bond is made on the right stripe and the second bond on the right post. Similarly, unit 11 can be operated initially for effectuating the bonds. Also, a manually operated apparatus has been shown in order to simplify the description, but it is noted that the apparatus readily lends itself to complete mechanization.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for bonding a wire-like element from a first area to a second area on an article, said areas being a fixed distance from each other, which comprises, a tool for feeding the element from a supply and for bonding the wire, means for locating the article so that the areas are in known positions with respect to the tool, means for transporting the tool to position the tool in bonding relation with the first area, and means for moving the tool a distance equal to the distance between the first and second area to position the tool in bonding relation with the second area.

2. Apparatus according to claim 1 in which the locating means includes, a viewing screen, reference markings on the screen corresponding to the bonding areas on the article, and means for orienting the article so that the bonding areas are in registration with the reference markings, said markings reflecting a prescribed relationship of the bonding areas with respect to the tool.

3. Apparatus for bonding a wire-like element from a first area to a second area on an article, said areas being a fixed distance from each other, which comprises, a tool for feeding the element from a supply and for bonding the wire, means for locating the article so that the areas are in a prescribed relationship to the tool, a slidable member for supporting and transporting the tool to the bonding areas, means for stopping the tool when it is in position for bonding the element to the first area, means operative for bonding the wire-like element to the first area, means for actuating the stopping means to move the slidable member to position the tool for bonding the wire to the second area, and means operative for bonding the wire-like member to the second area.

4. Apparatus according to claim 3 in which the stopping means is an eccentric cam shaft being of such contour for stopping the slide over the first bonding area and for moving the slide a distance equal to the distance between the first and second areas to position the tool for bonding the wire to the second area.

5. Apparatus for bonding a wire from a first area to a second area on an article, said areas being a preselected distance from each other, which comprises, a tool for feeding and bonding the wire, means for locating the article so that the areas are in a prescribed relationship to the tool, a slidable member for supporting and transporting the tool to the bonding areas, means for stopping the tool in position for bonding the wire to the first area, means for advancing the tool to move the wire into bonding relation on the first area, means for actuating the stopping means to move the slidable member to position the tool for bonding the wire to the second area, means operative for bonding the wire to the second area, and means for severing the wire after the wire is bonded to the second area.

6. Apparatus according to claim 5 in which the severing means includes, a resilient element connected to the slidable member and being in a fixed relationship to the wire supply, a cam affixed to the element, and means responsive to movement of the slide for engaging the cam as the slide is moved from the second bonded area causing the element to engage a braking force on the supply and apply a restraining force on the supply wire to break the wire adjacent the second bonded area.

References Cited in the file of this patent

UNITED STATES PATENTS

| | | |
|---|---|---|
| 2,409,615 | Daniel | Oct. 22, 1946 |
| 2,474,463 | Burrell | June 28, 1949 |
| 2,672,838 | Heidenreich | Mar. 23, 1954 |
| 2,795,687 | Hall | June 11, 1957 |
| 2,796,511 | Steele | June 18, 1957 |

FOREIGN PATENTS

| | | |
|---|---|---|
| 649,614 | Great Britain | Jan. 31, 1951 |

Disclaimer 3,083,595.—*Gerard A. Frank*, Allentown, and *Karl A. Schmuldt*, Emmaus, Pa. THERMO-COMPRESSION BONDING APPARATUS. Patent dated Apr. 2, 1963. Disclaimer filed Mar. 29, 1972, by the assignee, *Western Electric Company, Inc.*

Hereby enters this disclaimer to claim 1 of said patent.

[*Official Gazette June 13, 1972.*]